United States Patent
Jain et al.

(10) Patent No.: US 12,547,846 B2
(45) Date of Patent: Feb. 10, 2026

(54) RULES-BASED DECISION SUPPORT SYSTEM FOR ASSESSMENT OF DIGITAL CONTENT INVOLVING NATURAL LANGUAGE

(71) Applicant: VIRTUOSOURCE LLC, Dallas, TX (US)

(72) Inventors: Sunil Vinodkumar Jain, Irving, TX (US); Aditya Agarwal, Bengaluru (IN)

(73) Assignee: VIRTUOSOURCE LLC, Dallas, TX (US)

( * ) Notice: Subject to any disclaimer, the term of this patent is extended or adjusted under 35 U.S.C. 154(b) by 244 days.

(21) Appl. No.: 18/272,477

(22) PCT Filed: Jan. 14, 2022

(86) PCT No.: PCT/US2022/012627
§ 371 (c)(1),
(2) Date: Jul. 14, 2023

(87) PCT Pub. No.: WO2022/155539
PCT Pub. Date: Jul. 21, 2022

(65) Prior Publication Data
US 2024/0078392 A1  Mar. 7, 2024

Related U.S. Application Data

(60) Provisional application No. 63/137,262, filed on Jan. 14, 2021.

(51) Int. Cl.
*G06F 40/40* (2020.01)
*G06F 16/3329* (2025.01)
*G06F 40/205* (2020.01)

(52) U.S. Cl.
CPC .......... *G06F 40/40* (2020.01); *G06F 16/3329* (2019.01); *G06F 40/205* (2020.01)

(58) Field of Classification Search
CPC .... G06F 40/40; G06F 16/3329; G06F 40/205; G06F 16/3344; G06F 16/345; G06N 20/00; G06N 5/041; G06N 5/045
See application file for complete search history.

(56) References Cited

U.S. PATENT DOCUMENTS

| | | | |
|---|---|---|---|
| 10,380,246 B2 | 8/2019 | Clark et al. | |
| 10,503,830 B2 | 12/2019 | Biddle et al. | |
| 11,651,039 B1* | 5/2023 | Soubbotin | G06F 16/93 707/706 |
| 2020/0004822 A1* | 1/2020 | Chatterjee | G06F 40/289 |
| 2020/0034737 A1 | 1/2020 | Munro et al. | |
| 2021/0109958 A1* | 4/2021 | Behtash | G06F 18/214 |
| 2021/0279289 A1* | 9/2021 | Sevenster | G06F 16/90332 |

FOREIGN PATENT DOCUMENTS

| | | | |
|---|---|---|---|
| WO | 2018069449 A1 | 4/2018 | |
| WO | 2020185987 A1 | 9/2020 | |

* cited by examiner

*Primary Examiner* — Stella L. Woo

(57) ABSTRACT

A decision support system for assessing and reviewing large volume of digital content which comprise complex subject matter and providing recommendations on relevance of each content by applying context-based rules which are specific to the subject matter of interest. The rules are captured in a standardized format and the algorithm for the rules-based decision making is designed with the flexibility to select the rules based on the subject matter of interest.

17 Claims, 5 Drawing Sheets

Rules Grid

| | A-1 | A-2 | A-3 | A-4 | A-5 | A-6 | A-7 | A-8 | A-9 | A-10 | Assessment | Decision |
|---|---|---|---|---|---|---|---|---|---|---|---|---|
| Rule1 | 0 | 0 | 0 | 1 | 0 | 1 | 0 | 1 | 0 | 1 | AR-1 | D-1 |
| Rule2 | 0 | 1 | 0 | 1 | 0 | 1 | 0 | 1 | 0 | 1 | AR-2 | D-2 |
| Rule3 | 1 | 1 | 0 | 1 | 0 | 1 | 0 | 1 | 0 | 1 | AR-2 | D-3 |
| Rule4 | 0 | 1 | 1 | 1 | 0 | 1 | 0 | 1 | 0 | 1 | AR-2 | D-4 |
| Rule5 | 1 | 0 | 0 | 1 | 0 | 1 | 0 | 1 | 0 | 1 | AR-2 | D-5 |

FIGURE 3

RULES-BASED DECISION SUPPORT SYSTEM FOR ASSESSMENT OF DIGITAL CONTENT INVOLVING NATURAL LANGUAGE

TECHNICAL FIELD

The present disclosure generally relates to reviewing digital content, and more particularly relates to a decision support system which uses artificial intelligence techniques to read digital content involving natural language and make recommendations on relevance of the content in the context of the subject matter of interest for the reviewer.

BACKGROUND

There has been a rapid growth in digital content, most of which is published in the form of natural language. Digital content can be electronic documents available on the internet, stored on a cloud server or a standalone hardware server. A computer search is needed to perform a comprehensive and meaningful search on this content in an efficient and effective way. Review of this search requires reading and interpretation to make an assessment of the content in the context of the subject matter of interest. However, content in natural language may not be intelligible and interpretable by a computer and interpretation still requires human reviews.

There are many routine business processes which require review of new content periodically to monitor and answer question(s) on a recurrent basis. These questions require contextual interpretation of the content presented and make a recommendation or a decision. A computer can rapidly search and extract large volumes of digital information but as the size and complexity of content increases, it cannot easily determine the contextual relevance of the information it has extracted in relation to the subject matter. In such cases, a human review is required to review the content, determine if it has relevant information and then take necessary actions. However, the speed of processing of content by human review is generally slow and makes the review of large volumes of electronic documents very resource intensive and time consuming. Also, in the event of an unexpected surge in the volume of content, the resources may not be very scalable which presents a risk of timely completion of time-bound reviews and actions.

To overcome this challenge, automation using artificial intelligence (AI) techniques like machine learning and deep learning (ML/DL) have been used on large and complex content. Application of ML/DL requires a large set of annotated data for training and testing of the models which are then used to provide classification or other predictions on the content. The accuracy of these predictions is highly dependent on the volume, distribution and quality of annotated data used for model development.

If the volume of annotated data is small, it can lead to lower accuracy of prediction from the model or other risks such as over-fitting or lack of generalizability of the model. For classification of content using ML/DL techniques, the models generally require a balanced distribution such that the volume of annotated data in each category is similar to other categories. This poses a significant constraint for application of ML/DL in real-world situations where the outcomes are inherently imbalanced e.g. finding a rare or serious adverse reaction associated with a product, from medical literature as these cases represent a small fraction of the total no of literature articles. The quality of the annotated data used for training and testing has a critical role in the model predictions. If the data is not a representative sample of the future content which will be processed or if human does not accurately or consistently do annotation of training data, it can lead to a bias or inaccuracies in prediction.

Predictions from ML/DL models are typically not explainable i.e. an explanation of the rationale for a prediction is not provided with the prediction. This inability to provide explanation has generally been referred to as the 'black box' effect of AI. This poses constraints in applications where the explanation of the prediction is important to understand the rationale and can impact the acceptance of that prediction.

A rules-based approach makes the interpretation of content using a set of rules. It has several advantages over a machine-learning approach. These advantages include no requirement for large, annotated data-sets, better accuracy of output, higher speed of processing, and the ability to provide an explainable response. Existing rules-based systems use a series of IF-THEN-ELSE statements that guide a computer to reach a conclusion or recommendation based on certain rules or logic. The use of IF-THEN-ELSE is a workable approach to apply a small set of rules but this approach is not feasible when a large number of rules have to be applied to a given content. With a large set of rules, the coding can be overly complex making them prone to errors, the testing and debugging is extremely time consuming and if there are any new rules to be added, it could potentially require a change in the coding logic for all the rules which in turn triggers another full iteration of code development and testing.

A rules-based approach has conventionally been used for simple applications, but it has not been used for large content of high complexity. Current natural language processing (NLP) algorithms suffer from the problem that, as natural language sentences increase in length and complexity, there is a combinatorial increase in the number of mappings required to extract a fact from a given content. This translates to a proportional increase in the complexity of the algorithm and the time taken for fact extraction such that the NLP algorithm may not be able to complete its task in a reasonable time frame, or in some cases may not be able to complete it at all. The NLP algorithm may be allocated additional computing resources to reduce the time taken, but this solution is clearly a stop-gap solution that fails with an arbitrarily complex sentence. In addition, in some circumstances available computing resources may be limited, such that it is not possible to increase the computing resources available to process the NLP algorithm.

In view of these challenges of ML/DL and a rules-based approach, human review remains the only viable approach with its inherent time, effort, and scalability challenges. Thus, it is clear that a need exists for improved natural language processing systems and methods that can reliably extract facts and/or map queries from an arbitrarily complex natural language sentence or query in a time frame that is acceptable to a user without commandeering prohibitively substantial amounts of processing resources.

SUMMARY

To eliminate the above-mentioned disadvantages, the primary object of the present disclosure is to provide a hybrid approach which combines the benefits of a rules-based approach for decision-making with the ability to utilize ML/DL approaches to support the application of rules in cases where large data sets are available and explainable. The invention thus provides a contextual rule-based decision support system augmented with ML/DL techniques to process natural language content and recommend relevant content to a reviewer.

An objective of the disclosure is to provide a method for processing content involving natural language to answer question(s) which determine the contextual relevance of the content to the subject matter of interest. The method comprises parsing content comprising natural language input. The method comprises transforming the natural language input into context based attributes (CBAs), wherein transforming comprises performing a plurality of checks on the context based attributes, wherein each context based attribute (CBA) can be assigned a specific check which generates an outcome represented by an outcome value; and converting outcome values for each context based attribute into at least one of binary, ternary, or other discrete forms. The method comprises applying rules and making an assessment on the relevance of the natural language input for the subject matter of interest through qualitative and quantitative measures. The method comprises enabling a response to the question(s) based on the rules applied, wherein the response comprise a summary response and detailed response providing the basis for the assessment of each content.

An objective of the disclosure is to provide a computer software product for use on a computer system. The computer software product comprises a computer readable non-transitory storage medium, a computer program code means stored on the computer readable non-transitory storage medium, the computer program code means comprising encoded instructions, wherein the encoded instructions comprise parsing a natural language input, transforming the natural language input into CBAs which pertain to a subject matter of interest, applying rules and making an assessment on the relevance of the natural language input for the subject matter of interest, and enabling a response to the question based on the rules applied, wherein the response comprise a summary response and detailed response providing the basis for the assessment of each content.

Another objective of the disclosure is to provide a system for processing natural language input to answer question(s). The system comprises a server configured to parse content comprising natural language input, transform the natural language input into CBAs, wherein transforming comprises performing a plurality of checks on the CBAs, wherein each context based attribute can be assigned a specific check which generates an outcome represented by an outcome value, and converting outcome values for each context based attribute into at least one of binary, ternary, or other discrete forms. The server is configured to apply rules and making an assessment on the relevance of the natural language input for the subject matter of interest through qualitative and quantitative measures and enable a response to the question based on the rules applied, wherein the response comprise a summary response and detailed response providing the basis for the assessment of each content.

This summary is provided to introduce a selection of concepts in a simple manner that is further described in the detailed description of the disclosure. This summary is not intended to identify key or essential inventive concepts of the subject matter nor is it intended for determining the scope of the disclosure.

To further clarify advantages and features of the present disclosure, a more particular description of the disclosure will be rendered by reference to specific embodiments thereof, which is illustrated in the appended figures. It is to be appreciated that these figures depict only typical embodiments of the disclosure and are therefore not to be considered limiting of its scope. The disclosure will be described and explained with additional specificity and detail with the accompanying figures.

BRIEF DESCRIPTION OF THE FIGURES

The disclosure will be described and explained with additional specificity and detail with the accompanying figures in which:

FIG. 3 is an illustration of a rules grid, in accordance with an embodiment of the present disclosure;

Figure 1:
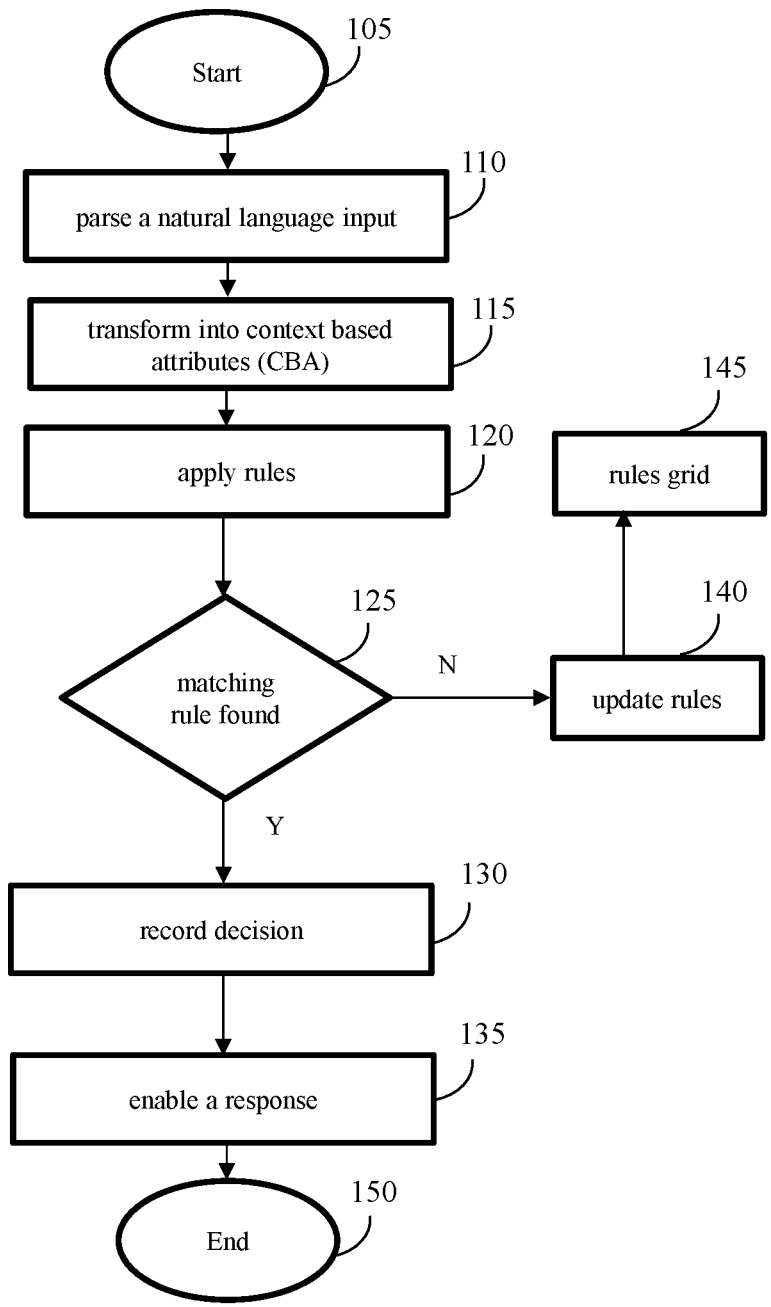
FIG. 1 is a flowchart of a method for processing natural language input to answer question(s), in accordance with an embodiment of the present disclosure.

Further, persons skilled in the art to which this disclosure belongs will appreciate that elements in the figures are illustrated for simplicity and may not have been necessarily drawn to scale. Furthermore, in terms of the construction, the decision support system and one or more components of it may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION

For promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

In the present disclosure, relational terms such as first and second, and the like, may be used to distinguish one entity from the other, without necessarily implying any actual relationship or order between such entities.

The terms "comprise", "comprising", or any other variations thereof, are intended to cover a non-exclusive inclusion, such that a process or method that comprises a list of steps does not include only those steps but may include other steps not expressly listed or inherent to such a process or a method. Similarly, one or more elements or structures or components preceded by "comprises . . . a" does not, without more constraints, preclude the existence of other elements, other structures, other components, additional devices, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The components, methods, and examples provided herein are illustrative only and not intended to be limiting.

Many types of research activities require review of electronic documents on a regular basis. This is routinely done in many fields including education, medicine, healthcare, engineering, legal and financial, to name a few. Examples of electronic documents include, but are not limited to published documents in journals available in digital format, public documents available on internet, patent literature, medical records, financial documents, internal records of an organization available to the employees, etc. Reviewing large volumes of electronic documents is resource intensive and time consuming. Often, searching for relevant documents involves querying the large volume of documents based on a set of search keywords which results in a collection of materials where such keywords were found. This provides a filtered set of electronic documents which generally have textual matches, but they do not necessarily convey contextual relevance. A reviewer who is trained in the subject matter of interest needs to manually review all the materials generated from a search exercise or further refine the search query by revising the search keywords to arrive at the desired document. To effectively utilize the search results, the reviewer has to read all the documents and identify those which are relevant to the subject matter and the documents which are not relevant. In most such exercises involving review of search results, only a small fraction of the search results is relevant while majority of the documents are found to be not relevant. Thus, a major portion of the review effort is spent on identifying irrelevant documents.

Embodiments of the present disclosure relate to decision support system that can be used to process complex natural language inputs and process them to search through large volume of digital content pertaining to various subject matter of interest and make reliable recommendations so that the human intervention in performing the search is minimal.

FIG. 1 is a flowchart of a method for processing natural language input to answer question(s), in accordance with an embodiment of the present disclosure. At first, context based attributes (CBAs) are defined. The CBAs provide contextual information related to a subject matter of interest and generate outcomes in the form of discrete output values. The CBAs help to determine relevance of the natural language content for the subject matter of interest, provide insights by answering key questions, and support decision making. In general, CBAs help to understand the context of a natural language statement. The CBAs evaluate the content of the natural language for a single question or a plurality of independent questions, wherein each question performs a check on the content of the natural language. The responses to all the questions presented by the CBA's determine the contextual relevance of the natural language content to the subject matter. Question(s) can be simple queries or complex queries. In one embodiment, the natural language input can have multiple sub-questions which contribute to the main question. In one embodiment, the natural language input can have a primary question and a secondary question, wherein the primary question is presented first and based on the response, the secondary question may be presented, whereas the secondary question can be related or not related to the primary question.

The method also includes setting rules initially. The rules are a unique combination of the outcome values of each context based attribute and helps to make an assessment of a content. An exemplary illustration of types of context based attributes is shown in table 1.

TABLE 1

| Context-Based Attribute (CBA) | Question | Check(s) to be performed | Outcome | No. of outcomes |
|---|---|---|---|---|
| Type-1 | Is a keyword/category present? | Check for Keyword(s) defining a category | Yes/No | Second order |
| Type-2 | What is the sentiment of a keyword? | Sentiment of keyword(s) | Positive/Negative/Neutral | Third order |
| Type-3 | Is association found between keywords? | Association between keywords | Found/Not Found | Second order |
| Type-4 | Is a value given for a keyword | Value of | >/=/< | Third order |
| Type-5 | Where is the keyword found? | Location of content | Section-1/2/3/4 | Fourth order |
| Type-6 | Is the category known/pre-defined? | Use of Meta-data for categorization | Category-1/2/3/4/ . . . | Higher order |
| Type-7 | Can classification be done? | Availability of reliable ML/DL models for classification | Class-1/2/3/4/ . . . | Higher order |

The method begins at step 105.

Step 110 includes parsing a natural language input. Parsing includes extracting content from a source and breaking-down the content into sentences, words, numerical values, and any other relevant categories. Further, parsing includes removing words which do not provide context, for e.g. prepositions which do not provide context. The content of interest is sent for further processing.

Step 115 includes transforming the natural language input into context based attributes (CBAs) which provide an understanding of the context through question(s) pertaining to a subject matter of interest. The parsed content is processed for each CBA. Transforming includes performing a plurality of checks on the CBAs. Each context based attribute (CBA) can be assigned a specific check which generates an outcome represented by an outcome value. The plurality of checks includes, but is not limited to, checking for one or more of keyword, sentiment, association, value, location of the alphabet or string, and a model based prediction as shown in Table 1. Further, the step of transforming includes converting outcome values for each context based attribute into at least one of binary, ternary, or other discrete forms. The outcome value can be a:

yes or no or
positive, negative, or neutral, or
found or not found or
a combination of greater than, less than or equal to or
a location-based input, or
categorization using meta-data, or
classification using ML/DL model(s).

Output for each CBA is sent to a digital location. Further, transforming includes consolidating output of all CBAs for a given content to develop a 'combination'. Further, rules are applied on each combination.

Figure 2:
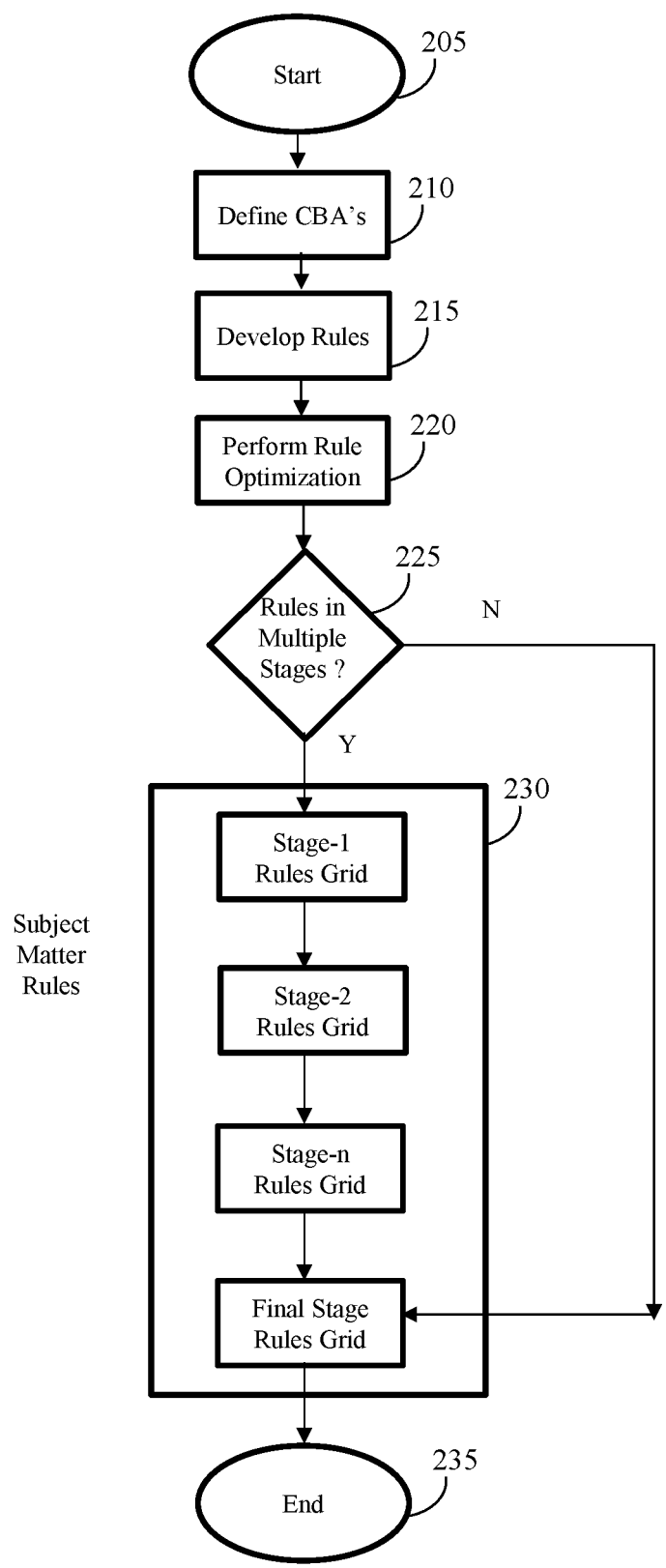
FIG. 2 is a flowchart describing the process of setting rules, in accordance with an embodiment of the present disclosure.
Figure 4:
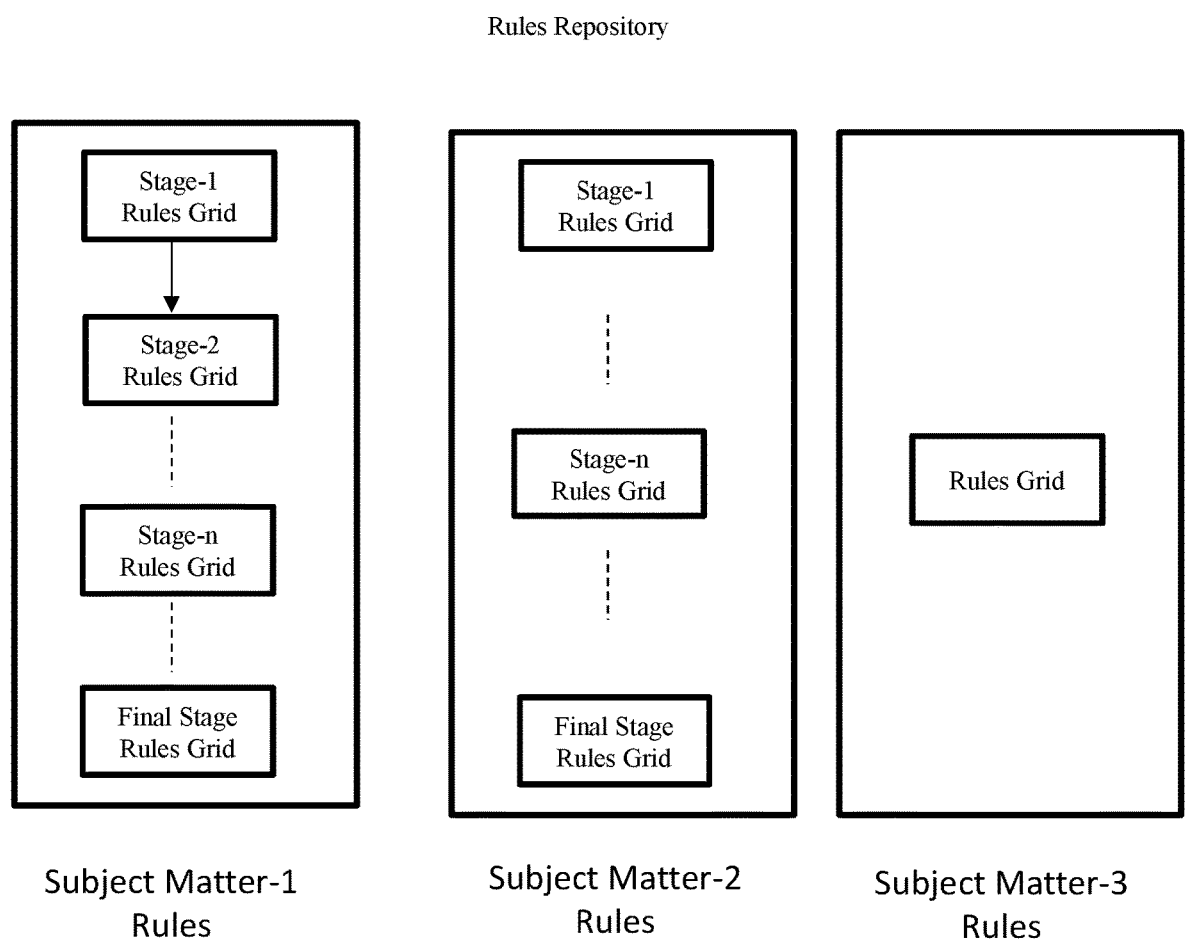
FIG. 4 is an illustration of a rule's repository, in accordance with an embodiment of the present disclosure.

The method includes setting rules and creating a rules grid (not shown in FIG. 1). The process for setting of rules is illustrated in FIG. 2. A rules grid is the set of effective rules required to answer a given question. A rules grid is illustrated in FIG. 3. For efficient processing of a content, the rules could be applied in one or more stages. A collection of all the rules applied in various stages is referred as the Subject Matter Rules. All the Subject Matter Rules could be stored in one or more rules repository(ies). A rules repository is illustrated in FIG. 4.

The method includes developing and maintaining the rules grid and rules repository in a separate environment outside the application code and developing the application with a flexible architecture such that any addition or deletion of rules noted in a rules grid, changes to the CBA combination for one or more rules, changes to the assessment and decision associated with one or more rules or changes to the number of rules grid utilized in stages in the Subject Matter Rules, can be done without requiring a change in the application logic or code. This enables de-coupling the creation, modification and utilization of rules from the application logic and allows the same application to be used to process content across different subject matter.

Step 120 includes applying rules. The rule that is predefined as a unique combination of the outcome values of each context based attribute represents a decision. Step 120 includes applying rules and making assessment on the relevance of the natural language input for the subject matter of interest. While applying rules, the combination for each content is compared with the rules grid.

Step 125 is a decision step to check whether a matching rule is found or not. If a matching rule is found, then the decision support system returns actions associated with the matching rule as an "assessment."

At step 130, using the assessment, a decision is recorded, or recommendation is made, and the content is categorized in relation to the subject matter. The categorization can be descriptors such as Relevant and Not Relevant which are qualitative descriptors. When more than one content is found within one category, the assessment could also include a quantitative assessment by ranking the content within a category. The ranking could be based on parameters related to one or more CBA outcomes contributing to a decision. For example if there are 10 articles found to be relevant, a form of ranking may be applied to these 10 articles. This is called as a quantitative measure.

If at Step 125, a matching rule is not found, then the rules are updated (Step 140) and stored in rules grid (Step 145).

Step 135 includes enabling a response to the question based on the rules applied. The user who posted the question is provided with a relevant result. The response can be a summary response. The response can also include a detailed response providing the basis for the assessment of each content.

Method ends at step 150.

FIG. 2 is a flowchart describing the process of setting rules, in accordance with an embodiment of the present disclosure.

The flowchart starts at step 205.

Step 210 includes defining the context based attributes (CBAs). The CBAs provide contextual information through question(s) related to a subject matter of interest and generate outcomes in the form of discrete output values.

Step 215 includes developing rules. The rules are a unique combination of the outcome values of each context based attribute and helps to make an assessment of a content.

Step 220 include performing rule optimization. The rule optimization is performed by any of the following approaches such as frequency based selection, staging approach or exclusion approach.

Step 225 is a decision step to check if rules are in multiple stages or not. If rules are in multiple stages, then rules are checked in the multiple stages, stage 1 . . . stage n. If rules are not in multiple stages, then rule is checked with a single final stage.

The flowchart ends at step 230.

The key challenge of a rules-based approach is the ability to set considerable number of rules with the flexibility to modify, add, and delete rules. This challenge has been resolved by using a structurally different concept to apply rules where each rule is defined as a unique combination of the outcome values of each context based attribute and an assessment and decision is associated with each rule.

The total number of unique combinations of the CBA's selected for a decision give the total no. of possible rules. The total number of unique combinations of CBA's can be calculated as below:

$$\text{Total no of unique combinations} = 2^{(Second\ order\ CBA's)} \times 3^{(Third\ order\ CBA's)} \times 4^{(Fourth\ order\ CBA's)} \times \text{Higher order CBA's} \ldots$$

To illustrate, a combination of 2 second order, 2 third order and 2 fourth order CBA's will have $2^2 \times 3^2 \times 4^2 = 576$ unique combinations. As the number of CBA's and/or order of each CBA grows, it increases the number of rules. e.g. addition of a single CBA of second order doubles the number of combinations to be captured in the rules grid.

A large set of rules can be very time and resource intensive and requires optimization for efficient processing of the content. The method includes performing rule optimization of the rules. The rule optimization is performed by any of the following approaches such as frequency based selection, staging approach or exclusion approach. However, it is to be noted that the approaches can be any other approach and is not limited to the aforementioned approaches. A brief about each approach is provided below:

Frequency Based Selection: Using a representative sample data-set, understand the few combinations which will provide an assessment for a high fraction of the sample data i.e. Capture rules which cover >=95% of the data. This can be done by various techniques such as frequency distribution, pareto chart, etc.

Staging approach: In this approach, break the CBAs into categories which can be tested in stages and only certain outcomes will be taken to the next stage. For e.g. in a fourth order, if only two outcomes relevant, we will check for that CBA in stage-1 and only content meeting any of these two outcomes will proceed to stage-2. This reduces the number of combinations to be handled by 50%.

Exclusion Approach: Under certain situation, co-existence of two CBA's may not have contextual relevance and do not impact the outcomes. In such cases, a single or set of CBA's can be ignored. Ignoring a CBA reduces the no. of combination by a factor which is equal to the order of the CBA. E.g. a 3rd order CBA if ignored can reduce the no. of combinations by a factor of 3.

The processing of the natural language input and decision-making is further explained with the example illustrations below:

Illustration-1: Evaluation of Content from a Scientific Publication:

Input Content:
OBJECTIVE: Although acetaminophen has emerged as a therapeutic option for treating hemodynamically significant patent ductus arteriosus (PDA) in preterm infants, limited data exist on pharmacodynamics. The objective of this research is to report serum acetaminophen concentrations at steady state in infants treated with intravenous acetaminophen for PDA and to examine associations with clinical outcomes.

METHODS: This retrospective study evaluated all infants admitted during the study period who received intravenous acetaminophen for the treatment of PDA. Acetaminophen dosing was 15 mg/kg every 6 hours. A serum acetaminophen concentration was obtained 4 hours after the eighth dose. Associations between serum concentrations and efficacy, assessed by ductal constriction on echocardiogram, and safety, assessed by serum creatinine and hepatic transaminases, were explored using simple linear regression. RESULTS: A total of 36 infants were included, with a median birth weight of 720 g (IQR 585-895 g) and a median gestational age of 25 weeks (IQR 24-26 weeks). The median acetaminophen concentration in the cohort was 12.3 mg/L (IQR 6.7-16.5 mg/L; range, 1.1-29.0 mg/L). Serum acetaminophen concentrations did not correlate with infant demographics, hepatic transaminases during treatment, or duct size at treatment completion. We observed ductal closure across a wide range of serum acetaminophen concentrations. CONCLUSIONS: We did not identify an association between acetaminophen serum concentrations following intravenous therapy and ductal response or hepatic toxicity.

Question to be answered for this content: Does this article contain information relevant for filing an individual case safety report (ICSR) ?

CBAs used to determine relevance of the input to the subject matter is given below in table 2:

TABLE 2

| Context-Based Attribute (CBA) | Checks Performed | Discrete Outcome Options | CBA outcome for the input content |
|---|---|---|---|
| Is there a patient noted? | Keyword | Yes/No (Y/N) | Y |
| How many patients are noted? | Logic | Single/Multiple (S/M) | M |
| Is the drug of interest noted? | Dictionary | Yes/No (Y/N) | Y |
| Is there an adverse event noted? | Keyword | Yes/No (Y/N) | Y |
| What is the sentiment associated with the adverse event? | Association + Keyword | Positive/ Negative/ Unknown (P/N/U) | N |
| Is this a review article? | Meta-data + ML/DL | Yes/No (Y/N) | N |

Unique combination of outcome value of each CBA forms a Rule: Y/M/Y/Y/N/N and the decision made by the rule corresponding to this combination is: The article does not have relevant information for an ICSR.

Illustration-2: Evaluation of Content from a Database Publishing Case Laws

Input Content:
Introduction: John Doe (Doe) has filed suit against the United States of America (the Government), seeking a refund under 26 U.S.C. § 7422 of allegedly illegal and erroneous taxes, penalties, and interest. A bench trial is set to proceed in this case in May 2012. Before me at this time is Doe's Motion For Reconsideration Of The Court's Jan. 22, 2010, Order Striking Both Of Plaintiffs Jury Demands And Motion Under Rule 6(b) To Allow Late Jury Demand (Doe's Motion To Reconsider). Doe urges me to reconsider the Order Granting Defendant's Motion To Strike Jury Demand (Strike Order), issued by since retired Chief Judge Alex R. Munson. I heard oral arguments on Doe's Motion To Reconsider on Aug. 18, 2011.

Background: The following is a summary of the relevant facts that gave rise to this case, as outlined in the parties' pleadings. The Internal Revenue Service (IRS) audited Doe for tax year 2002 and ultimately assessed taxes, interest, and penalties against him in the sum of $2,080,000. See Complaint § 19; Answer § 19. Doe asserts that the IRS erroneously and illegally assessed these taxes, interest, and penalties. Complaint 20. In February 2009, Doe paid the $2,080,000 assessment to the U.S. Department of Justice. Doe also filed a Claim for Refund with the IRS in February 2009 for tax year 2002. The IRS did not act in response to the Claim for Refund within six months and Doe subsequently filed suit. [3]

Conclusion: Doe's Motion to Reconsider is granted. The Strike Order is reversed. Doe's Motion Under Rule 6(b) To Allow Late Jury Demand is granted. Doe's Demand B, his Demand for Jury Trial, is proper. Doe's Demand A, in his Redlined Case Management Statement*1120, is also proper. The clerk is instructed to modify the docket to indicate that this is a jury trial.

Question to be answered for this content: Does the case description have relevant information on successful outcomes for appeals filed in a civil case involving tax payment ? CBAs used to determine relevance of the input to the subject matter is given below in table 3:

TABLE 3

| Context-Based Attribute (CBA) | Checks Performed | Discrete Outcome Options | CBA outcome for the input content |
|---|---|---|---|
| Is plaintiff a govt. entity? | Location + keyword | Yes/No | N |
| Is the defendant a govt. entity? | Location + keyword | Yes/No | Y |
| Is this a civil case? | Meta-data + keyword + ML/DL | Yes/No | Y |
| What is the matter involved? | Keyword | Tax/Others | T |
| Is this an appeal? | Location + keyword | Yes/No | Y |
| What is the outcome of the case? | Association + Keyword | Plaintiff Won/ Plaintiff Lost/ Unknown | W |

Unique combination of outcome values of each CBA forms a Rule: N/Y/Y/T/Y/W and the decision made by the rule corresponding to this combination is: The case description has relevant information.

In one embodiment, a system for processing natural language input to answer question(s) includes a server. The server can be a standalone server or a cloud server. The standalone server includes standard computer components, including random access memory (RAM), at least one processor, and external interfaces all interconnected by a bus. The external interfaces include universal serial bus (USB) interfaces, at least one of which is connected to a keyboard and a pointing device such as a mouse, a network interface connector (NIC), which connects the server to a communications network such as the Internet, and a display adapter, which is connected to a display device such as an LCD panel display.

The server is configured to parse a natural language input. The server is configured to transform the natural language input into CBAs, wherein transforming includes performing a plurality of checks on the CBAs, wherein each context based attribute can be assigned a specific check which generates an outcome represented by an outcome value and converting outcome values for each context based attribute into at least one of binary, ternary, or other discrete forms. The server is configured to apply rules and making an assessment on the relevance of the natural language input for the subject matter of interest through qualitative and quantitative measures and enable a response to the question based on the rules applied, wherein the response comprise a summary response and detailed response providing the basis for the assessment of each content.

Further, the server is configured to create a rules grid which is the set of effective rules required to answer a given question. The server is configured to perform rule optimization. The rule optimization is performed by, but not limited to a frequency based selection approach, a staging approach, and an exclusion approach.

The process executed by the server is implemented in the form of programming instructions of one or more software modules stored on non-volatile (e.g., hard disk) storage associated with the computer system. Alternatively, at least parts of the software modules could be implemented as one or more dedicated hardware components, such as application-specific integrated circuits (ASICs) and/or field programmable gate arrays (FPGAs).

It is to be noted that the method of processing natural language input can reside on a standalone computer or a hardware device with a processor, a computer readable non-transitory storage medium, and a computer program code means stored on the computer readable non-transitory storage medium. The computer program code means comprising encoded instructions. The encoded instructions include instructions for parsing a natural language input and transforming the natural language input into CBAs which pertain to a subject matter of interest. The encoded instructions for transforming include performing a plurality of checks on the CBAs, wherein each context based attribute can be assigned a specific check which generates an outcome represented by an outcome value, Further encoded instructions include instructions for converting outcome values for each context based attribute into at least one of binary, ternary, or other discrete forms. Further, the encoded instructions may apply rules, wherein the rules are predefined as a unique combination of the outcome values of each context based attribute. Thereafter, the encoded instructions can determine relevance of the natural language input for the subject matter of interest and enable a response to the question based on the rules applied. The encoded instructions include defining CBAs which are relevant to the subject matter. The encoded instructions include creating a rules grid which is the set of effective rules required to answer a given question. The CBAs help to determine relevance of the natural language content for the subject matter of interest, provide insights by answering key questions, and support decision making. The plurality of checks comprises checking for one or more of keyword, sentiment, association, value, location of the alphabet or string, and a model based prediction. The encoded instructions include performing rule optimization, wherein the rule optimization is performed by any of the following methods, but not limited to frequency based selection, staging approach, or exclusion approach.

Referring to FIG. 3 and FIG. 4, FIG. 3 illustrates a rules grid and FIG. 4 illustrates a rules repository. A rules grid is a set of effective rules required to answer a given question. All the rules for the different subject matter could be stored in a rule's repository. In one example, a rules repository may have multi-stage rules grid for a subject matter (Subject matter—1 rules and Subject matter—2 rules) and a single stage rules grid for a subject matter (Subject matter—3 rules) as illustrated in FIG. 4.

Figure 5:
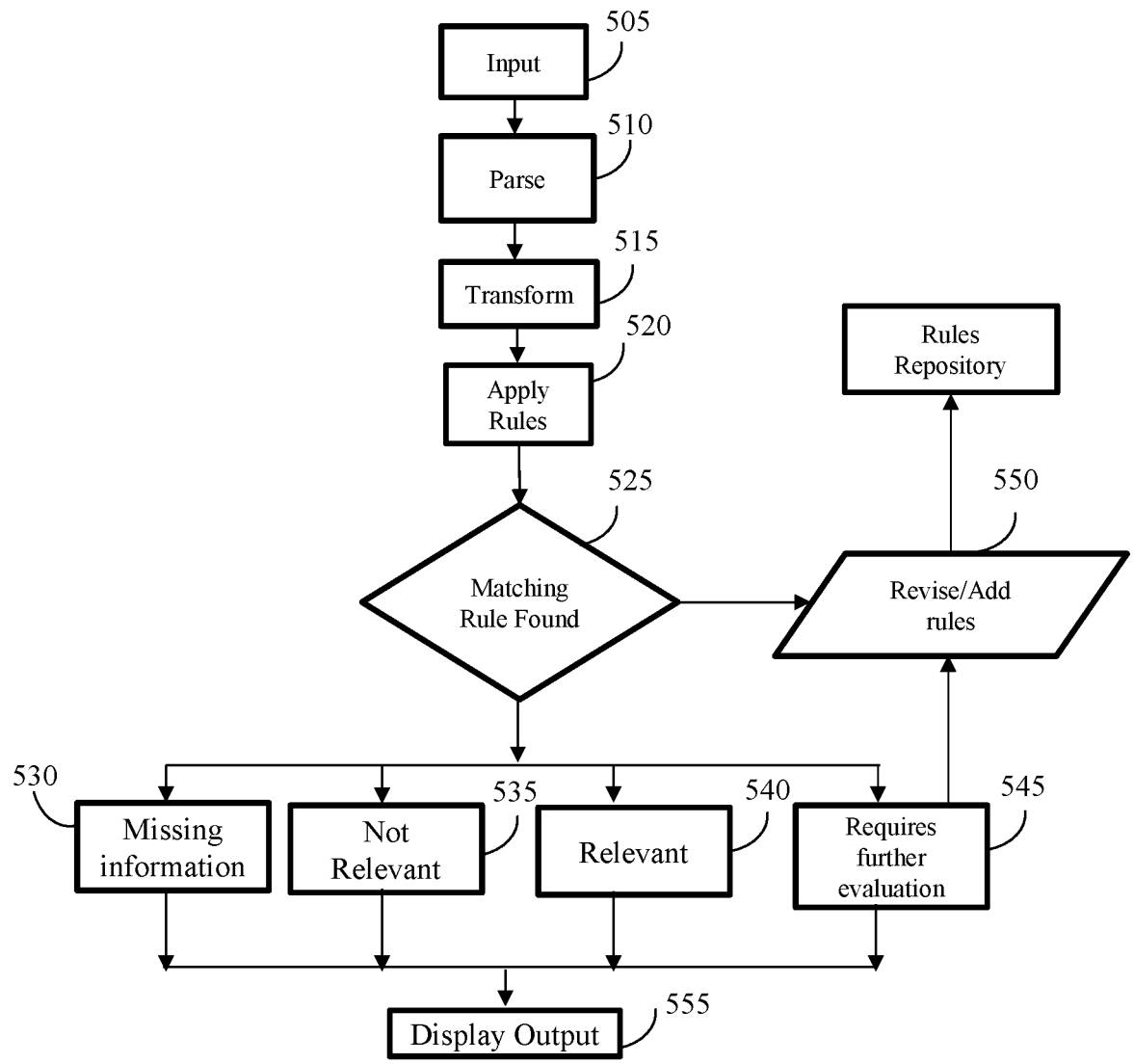
FIG. 5 is an illustration of a process in a decision support system, in accordance with an embodiment of the present disclosure.

Referring to FIG. 5, FIG. 5 is an illustration of a process in a decision support system, in accordance with an embodiment of the present disclosure. The decision support system utilizes the steps of parsing, transforming, decision-making, and optimization to obtain and process data. At step 505, search keywords are provided as input to the decision support system. At step 510, the step of parsing is performed. The step of parsing involves extracting articles from multiple sources and databases and mapping it to the core data structure used in the decision support system. At step 515, transforming is performed. Transforming includes indexing. Indexing involves searching and tagging the articles based on CBAs, association of keywords and sentiments of keywords. Indexing involves finding the presence of keywords and categorizing them by context based attributes (CBAs). This indexing is done using a variety of Natural Language Processing techniques.

CBAs are key elements of the decision-making process which determine the relevance of a digital content to the subject matter of interest (SMI). For example, in a content review where detection of study subjects and therapeutic drugs may provide contextual relevance, 'Animal' and 'Humans' may be considered as a context-based attribute. A list of keywords for these CBA's can be developed or an existing ontology which provides the relevant keywords can be used. Therapeutic drugs could be another CBA which may rely on a drug dictionary or machine-learning model prediction for detection. After the keywords are identified, indexing is performed. Indexing is the process of reviewing the content and detecting keywords related to a CBA. It helps to respond to questions noted in each CBAs in discrete forms (e.g., Yes, No, NA; Positive, Negative, Neutral; etc.). The combination of discrete output obtained for each CBA helps to formulate a combination of outcomes for the set of CBA's applied to a given content. This is called as the 'CBA Combination'. The CBA combination for each content is compared with the rules in the rules-grid to arrive at a decision. The assessment associated with that decision is noted as the basis of the decision.

At Step 520, rules are applied.

At Step 525, a decision to check whether rules are matching is performed. The outcome of step 525 results in any of the following decisions, missing information 530, not relevant 535, relevant 540, or requires further evaluation 545.

The process of application of rules and decision making is further explained in conjunction with the below scenarios:

Scenario 1: Subject Matter-1 (SM-1): Drug Research and Development

Consider a scenario where a subject matter expert is reviewing large volume of electronic documents pertaining to drug research and wishes to find relevant documents relating to the safety of a drug. The below table 4 is the rule base or the decision grid representing how contextual rules are coded in accordance with one embodiment. Each row represents a condition with a unique combination of associated code values for each attribute and provides a decision for that condition.

TABLE 4

| Condition | Has Animal? | Has Human? | Is Clinical Trial? | Contains Drug? | Has Safety Info? | Has Association? | Has Sentiment? | Decision |
|---|---|---|---|---|---|---|---|---|
| 1 | Y | N | NA | NA | NA | NA | NA | Not Relevant |
| 2 | N | Y | Y | Y | Y | Y | N | Relevant |
| 3 | N | Y | Y | Y | N | N | P | Requires Further Evaluation |

Consider a contextual condition provided by a subject matter expert (SME): "Any publication involving animals are not relevant". This contextual condition defined by the subject matter expert is transformed into a rule where the unique combination of each CBA outcome is represented by condition-1 in table-4. In this rule, the condition to be met for the CBA 'Has Animal' is a Y and for the CBA 'Has Human' is a N. The other independent attributes get a 'NA' assigned as the presence of an animal subject and absence of human subject are sufficient conditions to establish that the material is not relevant. The outcome values for the other CBA's are not required to make a decision, hence they are given an NA.

Consider another contextual condition provided by a SME: "Publications which have human data where safety event is severe and associated with the drug are of relevance". This is transformed into a rule represented by condition-2 in table 4. In this rule, the condition for all CBA's have to be met for the article to be considered as Relevant.

There may be cases where decisions for all possible set of outcomes may not be known. In such cases, a default decision 'Requires Further Evaluation (RFE)' is applied. This allows the decision grid to be completed and it also enables learning and refining to improve the decision-making logic. For example, consider condition-3, where both Human subjects are found, Drug and Safety attributes are both Y, the sentiment is positive, but Association is a N, the system makes the decision "Requires Further Evaluation".

Scenario 2: Subject Matter-2 (SM-2): Legal Case Research

Another example scenario is where a subject matter expert is reviewing large volume of electronic documents pertaining to legal cases and wishes to find relevant documents where plaint civil relating to legal jurisprudence of a particular case involving reversal of lower court. The below table 5 is the rule base or the decision grid representing how context are mapped to key attributes and how a decision is arrived at.

TABLE 5

| Condition | Has Plaintiff Info? | Has Defendant Info? | Is a Civil Case? | What Matter is Involved? | Is it an Appeal | Is Outcome known? | Has Sentiment? | Decision |
|---|---|---|---|---|---|---|---|---|
| 1 | Y | Y | Y | O | Y | L | NA | Not Relevant |
| 2 | Y | Y | Y | T | Y | W | N | RFE |
| 3 | Y | Y | N | T | Y | W | P | Relevant |

Rules pertaining to the various subject matter are stored in a digital repository called the Rules Repository. In one example, rules may apply to the subject matter "drug research", rules may apply to the subject matter "legal research" and rules may apply to the subject matter "patents". The decision support system enables subject matter experts to define the rules.

Decision making involves mapping of the keywords to the rules using an association logic. The association logic involves taking input of keywords from the indexing step and applying context-based rules specific to a subject matter to make recommendation if the article is relevant or not relevant to the subject matter of interest (SMI). The rules are specific to the SMI, and different set of rules are applied for each SMI. It is to be noted that the decision making logic is designed for learning and optimization. The decision support system is designed in a flexible way allowing subject matter experts to change or optimize the rules. In certain cases where the decision logic is unable to make a deterministic decision on relevancy of an article, it tags the article as 'Requires Further Evaluation'. Such articles noted under 'Requires Further Evaluation' are channeled back to the SMI's for review and refinement 550 of the rules used for decision-making, thus helping to optimize the effectiveness of the rules and accuracy of output. The refined rules or newly added rules (Step 550) are updated in rules repository. At step 555, the relevant document is provided as output to the reviewer.

In the applicant's disclosure, the decision making is done by identifying occurrence or absence of attributes applying context-based rules which are specific to the subject matter of interest. The rules are captured in a standardized format and the algorithm for the rules-based decision making is designed with the flexibility to change the rules based on the subject matter of interest. There are multiple advantages of the applicant's disclosure over prior arts:

The applicant's invention uses context-based attributes and rules as the basis for reviewing content decision. This context-based approach replicates how humans read content in the context of a subject matter and generally gives much better performance, especially when working with complex subject matter requiring high expertise and with limited data.

The invention provides an end-to-end process of accepting collection of content as input and providing a decision on each content and generating the output with the associated assessment to explain the basis of the decision, this entire process from input to output being done without human intervention.

the applicant's invention can work with small volumes of data for rules development and testing. It has the flexibility to apply ML/DL models to specific context-based attributes where sufficient data is available but does not require large and accurate annotated data-sets of the full content which is challenging in real-world applications.

The invention addresses a key limitation of rules-based approach by enabling a large volume of rules to be developed, processed and modified efficiently.

The invention provides a standard methodology for decision-making which can be applied to review content involving different subject matter.

While specific language has been used to describe the disclosure, any limitations arising on account of the same are not intended. As would be apparent to a person skilled in the art, various working modifications may be made to the method to implement the inventive concept as taught herein.

The figures and the description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible.

What is claimed is:

1. A method for processing natural language input to answer questions, the method comprising:
    parsing content comprising the natural language input;
    transforming the natural language input into context-based attributes, wherein transforming comprises:
        performing a plurality of checks on the content, using the context-based attributes, wherein each context-based attribute is assigned a specific check which generates an outcome represented by an outcome value; and
        converting outcome values for each context-based attribute into at least one of binary, ternary, or other discrete forms;
    creating a rules grid which is a set of rules, used to process the natural language input;
    applying the set of rules to make an assessment on relevance of the natural language input for a subject matter of interest through qualitative and quantitative measures, indicating relevance and ranking the content, respectively; and
    enabling a response to the questions based on the set of rules applied, wherein the response comprises a summary response and a detailed response providing a basis for the assessment of the content.

2. The method for processing natural language input as claimed in claim 1, comprising defining the context-based attributes, wherein the context-based attributes provide contextual information related to the subject matter of interest and generate outcomes in a form of discrete output values.

3. The method for processing natural language input as claimed in claim 1, comprising setting rules, wherein the rules are defined by a combination of the outcome values of each context-based attribute, which are used to make the assessment of the content.

4. The method for processing natural language input as claimed in claim 1, wherein the context-based attributes are used to determine the relevance of the natural language content for the subject matter of interest, by evaluating the content based on the context-based attributes.

5. The method for processing natural language input as claimed in claim 1, wherein the plurality of checks comprises checking for one or more of a keyword, a sentiment, an association, value, a location of an alphabet or a string, and a model based prediction.

6. The method for processing natural language input as claimed in claim 1, wherein the outcome value comprises one or more of:
    yes or no;
    positive, negative, or neutral;
    found or not found;
    a combination of greater than, less than or equal to;
    a location-based input;
    categorization using meta-data; and
    classification using ML/DL models.

7. The method for processing natural language input as claimed in claim 1, wherein a rule of the set of rules that is predefined as a distinct combination of the outcome values of each context-based attribute, represents a decision.

8. The method for processing natural language input as claimed in claim 1, wherein applying the set of rules comprises performing rule optimization by one or more of:
    a frequency based selection;
    a staging approach; and
    an exclusion approach.

9. A computer software product for use on a computer system, the computer software product comprising:
    a computer readable non-transitory storage medium,
    computer program code means stored on the computer readable non-transitory storage medium, the computer program code means comprising encoded instructions, wherein the encoded instructions comprise:
    parsing content comprising the natural language input;
    transforming the natural language input into context-based attributes, wherein transforming comprises:
        performing a plurality of checks on the content, using the context-based attributes, wherein each context-based attribute is assigned a specific check which generates an outcome represented by an outcome value; and
        converting outcome values for each context-based attribute into at least one of binary, ternary, or other discrete forms;
    creating a rules grid which is a set of rules, used to process the natural language input;
    applying the set of rules to make an assessment on relevance of the natural language input for a subject matter of interest through qualitative and quantitative measures, indicating relevance and ranking the content, respectively; and enabling a response to the questions based on the set of rules applied, wherein the response comprises a summary response and a detailed response providing a basis for the assessment of the content.

10. The computer software product claim of claim 9, wherein the context-based attributes are used to determine the relevance of the natural language content for the subject matter of interest, by evaluating the content based on the context-based attributes.

11. The computer software product claim of claim 9, wherein the plurality of checks comprises checking for one or more of a keyword, a sentiment, association, a value, a location of an alphabet or a string, and a model based prediction.

12. The computer software product claim of claim 9, wherein the outcome value comprises one or more of:
   yes or no;
   positive, negative, or neutral;
   found or not found;
   a combination of greater than, less than or equal to;
   a location-based input;
   categorization using meta-data; and
   classification using ML/DL model.

13. The computer software product claim of claim 9, wherein a rule of the set of rules that is predefined as a distinct combination of the outcome values of each context-based attribute, represents a decision.

14. The computer software product claim of claim 9, wherein applying the set of rules comprises performing rule optimization by one or more of:
   a frequency based selection;
   a staging approach; and
   an exclusion approach.

15. A system for processing natural language input to answer questions, the system comprising a server configured to:
   parse content comprising the natural language input;
   transform the natural language input into context-based attributes, wherein transform comprises:
      performing a plurality of checks on the content, using the context-based attributes, wherein each context-based attribute is assigned a specific check which generates an outcome represented by an outcome value; and
      converting outcome values for each context-based attribute into at least one of binary, ternary, or other discrete forms;
   create a rules grid which is a set of rules, used to process the natural language input;
   apply the set of rules to make an assessment on relevance of the natural language input for a subject matter of interest through qualitative and quantitative measures, indicating relevance and ranking the content, respectively; and
   enable a response to the questions based on the set of rules applied, wherein the response comprises a summary response and a detailed response providing a basis for the assessment of the content.

16. The system as claimed in claim 15, wherein the server is configured to define the context-based attributes, which are relevant to the subject matter.

17. The system as claimed in claim 15, wherein the server is configured to apply the set of rules to perform rule optimization, by one or more of:
   a frequency based selection;
   a staging approach; and
   a exclusion approach.

* * * * *